United States Patent [19]
Weimer et al.

[11] Patent Number: 5,914,542
[45] Date of Patent: Jun. 22, 1999

[54] SUPER CAPACITOR CHARGING

[75] Inventors: Joseph A. Weimer, Springboro; Bick T. Nguyen, Miamisburg; Marian K. Kazimierczuk, Beavercreek; Brett A. Jordan, London, all of Ohio

[73] Assignee: The United States of America as represented by the Secretary of the Air Force, Washington, D.C.

[21] Appl. No.: 08/843,406

[22] Filed: Apr. 15, 1997

[51] Int. Cl.[6] .................................................. H01H 47/00
[52] U.S. Cl. ........................ 307/125; 307/43; 307/64; 307/85; 307/23; 307/82; 323/222; 323/224
[58] Field of Search .................................. 307/43, 44, 45, 307/46, 64, 65, 66, 70, 80, 82, 84, 85, 86, 87, 18, 23; 323/222, 223, 224, 282–285

[56] References Cited

U.S. PATENT DOCUMENTS

| | | | |
|---|---|---|---|
| 4,551,632 | 11/1985 | Jourdan et al. | 307/9 |
| 4,802,859 | 2/1989 | Gouldy et al. | 439/74 |
| 4,967,096 | 10/1990 | Diemer et al. | 307/19 |
| 5,256,907 | 10/1993 | Shimada et al. | 307/82 |
| 5,359,277 | 10/1994 | Cowett, Jr. | 323/207 |
| 5,373,195 | 12/1994 | De Doncker et al. | 307/45 |
| 5,602,464 | 2/1997 | Linkowsky et al. | 323/272 |
| 5,612,579 | 3/1997 | Wisbey et al. | 307/18 |

*Primary Examiner*—Richard T. Elms
*Assistant Examiner*—Jonathan S Kaplan
*Attorney, Agent, or Firm*—Gerald B. Hollins; Thomas L. Kundert

[57] ABSTRACT

An aircraft electrical energy supply bus supplementing arrangement based on large capacitor or super capacitor storage of electrical energy for bus supplementation. Supplying of bus energy to the large capacitor is addressed in the invention. In this supplying energy is removed from the aircraft bus during quiescent conditions under the control of a energy coupling circuit which has a plurality of different energy removal rates, rates which are selected in response to the yet needed amount of capacitor charging and in a time-constant-controlled manner. Feedback control of this charging time constant selection is employed along with passive electrical device dissipation of major fractions of the time constant apparatus energy losses.

20 Claims, 7 Drawing Sheets

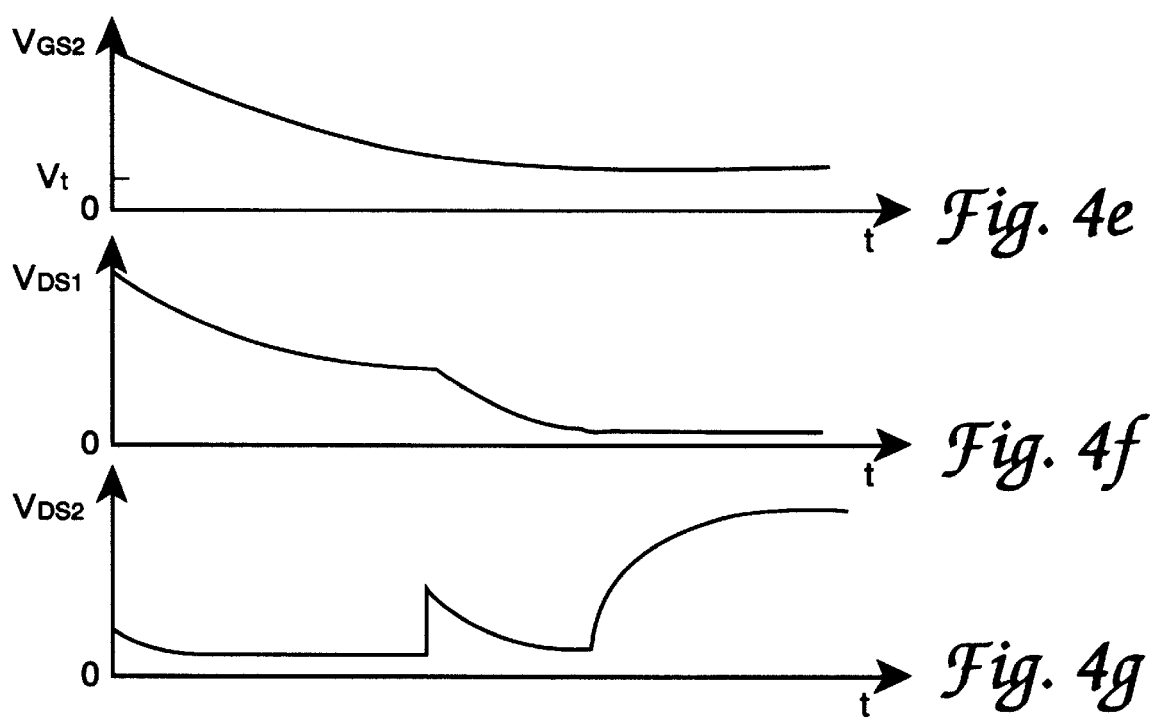

SUPER CAPACITOR CHARGING

CROSS REFERENCE TO RELATED PATENT DOCUMENTS

The present document is somewhat related to the copending and commonly assigned patent documents "Feedfoward Control of Aircraft Bus DC Boost Converter", AFD 00129, Ser. No. 08/843,428; and "Super Capacitor Battery Clone" AFD 00102, Ser. No. 08/843,408, now U.S. Pat. No. 5,850,113; which are filed of even date herewith. The contents of these related two

RIGHTS OF THE GOVERNMENT

The invention described herein may be manufactured and used by or for the Government of the United States for all governmental purposes without the payment of any royalty. applications are hereby incorporated by reference herein.

BACKGROUND OF THE INVENTION

This invention relates to the charging of electrical energy storage components, and more particularly to a charger usable with the super capacitor energy storage elements of an aircraft electrical energy supply augmentation apparatus.

Batteries are widely used to store electrical energy. However, the use of batteries encounters numerous problems, problems largely relating to the electrochemical nature of an electrical battery, problems which include severe energy density limitations, environmental hazards, safety problems, maintenance costs, charging rate limitations, finite number of possible charge cycles and battery life, memory problems in some batteries such as the popular NiCd device, complicated charging circuits, and need for continuous replacement.

Future aircraft electrical energy supply systems in addition may involve the widespread use of a higher voltage direct current electrical energy distribution bus, a distribution involving energization by the rectified output of a polyphase alternator and voltages above the level of one hundred volts, for example. In addition to greater levels of energy availability and reduced weight of conductor metal which is possible in such distribution systems, the use of higher voltage distribution in these future aircraft is seen to offer advantages in the area of lower bus current levels, smaller bus, conductor space requirements, and better electrical transient control or filtering, particularly as to filter weight reduction. These advantages are considered to outweigh the obvious complications of conventional battery exclusion from the bus (e.g., because of the large number of individual battery cells required), absence of bus-accomplished stand alone or static engine start capability, increased hazard to personnel, and increased electrical insulation requirements. The F-22 tactical aircraft is perhaps one of the first aircraft with bus energization of this higher voltage direct current type to be considered for widespread use by the United States Air Force. Additional discussion regarding the energy bus arrangements under consideration for future aircraft and the criticality of some loads supplied from these bus arrangements is to be found in the technical paper "Power Management and Distribution for the More Electric Aircraft" by Joseph A. Weimer, presented at the Intersociety Energy Conservation Engineering Conference (IECEC) as paper No. AP-385, ASME 1995.

As an improvement to both these future high voltage aircraft systems, and to present-day lower voltage direct current bus distribution systems as well, the use of energy storage accomplished in a replacement or a supplement to the commonly encountered electrical battery, e.g., the lead-acid or nickel-cadmium battery, is envisioned. Moreover, the use of such energy storage capability disposed at several distributed locations along the physical extent of an electrical bus or disposed within particular bus load devices (such as avionics or other electronic system housings) is a part of this improved aircraft bus thinking. Such energy storage capability may take the form of one or more storage elements which can float on the bus with little energy demand or current flow during normal operating conditions, employ relatively low current and long duration recharging times and then be capable of rapidly supplying energy to accommodate brief intervals of heavy bus demand or transient loading or bus source interruption. Such arrangements could, for example, enable further reductions in bus metal mass and cross-sectional area and improve voltage regulation along the bus, i.e., could enhance the tradeoff between bus size and bus voltage regulation.

The configuration of such energy storage elements used at distributed locations along a bus for this heavy demand or transient loading improvement is now considered to reasonably include large capacitance capacitors, i.e., capacitors of the multiple farad electrical size or "super capacitor" type; such capacitors are also known as double-layer capacitors in the art. In this configuration it is notable that the capacitor is employed as an energy storage element rather than for its low alternating current impedance or other characteristics. Indeed, a super capacitor may not provide the lowest alternating current impedance available in a capacitor. Such "super capacitors" are, however, considered preferable to a battery for present energy storage uses for reasons of size, weight, reliability and decreased maintenance requirements, and are now readily available as commercial products. Capacitors of this nature are, however, most readily fabricated as units of large electrical size having moderate operating voltage capability. As noted below herein sizes such as an integral number of farads of electrical capacitance and a few tens of operating volts capability are now conveniently provided. Capacitors of this electrical rating may of course be combined in appropriate series and parallel combinations for use in the present invention.

By way of additional background it may be interesting to consider that the super capacitor element itself was first investigated by Helmholtz in 1879. According to one super capacitor arrangement, one electrode of the device is made of carbon and the other is made of a liquid electrolyte. When a voltage is applied to the carbon layer with respect to the liquid electrolyte, a thin dielectric layer is established adjacent the carbon layer particles. The effective surface area of the dielectric layer and the carbon particles is, however, extremely large. Surface areas on the order of 1000 square meters per gram of carbon material can be achieved with such electrode arrangements because of the porous surface of the carbon and the small carbon particle size. The thickness of the dielectric layer on the other hand can be extremely small—on the order of 1 nanometer. As a result, a high ratio of surface area to dielectric thickness can be obtained and surprising capacitances per unit of capacitor volume are obtainable, therefore desirable volumetric efficiency is obtained for such a capacitor. As may be surmised from a consideration of such structural details, however, questions of permissible operating voltage (i.e., the dielectric strength of the thin dielectric layer), tolerable current flow rates and resulting temperature rise, energy losses, liquid electrolyte inconvenience and physical stability of this type of super capacitor require special consideration in the capacitor's design and fabrication sequences.

The large capacitance of super capacitors nevertheless permits the storage of relatively large amounts of energy. As is well known in the electrical art, however, a change in the quantity of electrical energy stored in a super capacitor or any capacitor, unlike most battery types, involves a precisely related change in the capacitor's terminal voltage; moreover, the capacitor's stored energy quantity is a square-law function of the capacitor's terminal voltage. Therefore, in an energy storage use of such a capacitor there is a need for a power processing circuit capable of maintaining the output voltage constant while the voltage across the super capacitor decreases due to its discharge. When viewed from a different perspective this decreasing voltage relationship also dictates that the storage of useful quantities of electrical energy in a capacitor of practical electrical and physical size requires the capacitor to operate under conditions of large terminal voltage swing. This characteristic is, however, poorly suited to direct bus shunting use of such capacitors in an aircraft or in other electrical bus supplementing applications since a bus is desirably operated with very limited changes in voltage. Enormously sized capacitors are therefore required to store meaningful quantities of usable energy under the conditions of little capacitor voltage change.

The use of an electronic coupling arrangement, i.e., a device such as a direct current to direct current inverter switching circuit, is seen as an answer to this storage efficiency and other difficulties such capacitor energy storage can encounter. With such a coupling circuit providing energy transfer between a "super capacitor" storage element and the aircraft bus, the capacitor voltage can be allowed to swing through a large range and thereby provide relatively efficient (and again voltage square law-determined) energy storage while the aircraft bus voltage is held nearly constant. Such a coupling arrangement also allows a marriage of incompatible capacitor and bus voltage ratings, allows for controlled or limited current recharging of the capacitor from the bus and other advantages. With respect to the marriage of incompatible capacitor and bus voltage ratings in a bus supplement apparatus, it is perhaps helpful to appreciate that presently available super capacitors are capable of several hundred farads of capacitance within a single physical container and with an operating voltage of 3–20 volts. Such capacitors provide a stored energy density of 10–20 joules per gram of capacitor weight.

The present invention, and each of the above-identified companion inventions relating to the present invention, concern a different portion of an aircraft bus supplementing energy storage arrangement disposed generally according to this description. In the present invention a particular aspect of a capacitance charging electronic coupling between an aircraft supply bus and a "super capacitor", i.e., one aspect of a direct current charging arrangement for a super capacitor energy storage element, is considered. The present invention provides an alternative for the super capacitor charging disclosed in the above identified "Super Capacitor Battery Clone", AFD 00102, Ser. No. 08/843,408 patent application and particularly addresses one aspect of the difference encountered in use of a voltage-responsive capacitance element rather than a fixed voltage battery element for storing bus supplement energy, a difference encountered in supplying energy directly to the super capacitor storage element. Another of these patent application, the Feedforward Control of Aircraft Bus DC Boost Converter, AFD 00129, Ser. No. 08/843,428, addresses an alternate control of the super capacitor discharging operation.

The prior art is known to contain numerous arrangements for supplying energy to an electrical capacitance element. It is believed, however, that this prior art does not extend to a practical addressing of conditions encountered in supplying energy to a particular type of capacitor, the super capacitor, when this super capacitor is embodied in aircraft bus supplementation apparatus.

SUMMARY OF THE INVENTION

The present invention provides controllable energy coupling to an energy storage element used in aircraft energy supply bus supplemental service.

It is an object of the present invention therefore to provide an aircraft direct current to direct current coupling arrangement usable to communicate energy to a bus supplementing energy storage element.

It is another object of the invention to provide a multiple time constant controlled aircraft bus supplement energy coupling arrangement.

It is another object of the invention to provide an aircraft bus-sourced energy supplement arrangement in which energy losses occurring during direct energy storage in a capacitor element are optimally divided between passive and active dissipating components.

It is another object of the invention to provide an aircraft energy bus supplement storage arrangement in which the major fraction of energy storage-related losses are relegated to simple and small passive circuit elements.

Additional objects and features of the invention will be understood from the following description and claims and the accompanying drawings.

The present invention involves a direct current aircraft electrical energy distribution apparatus wherein a rotating dynamoelectric machine source of direct current electrical energy located in a central portion of the aircraft is coupled to an electrical bus having an array of electrical bus conductors, including an electrically insulated conductor, connected with the dynamoelectric machine source of direct current electrical energy and extending throughout the aircraft including less central portions of the aircraft and is connected in energizing relationship with a plurality of electrical switch-controlled rotating machine, and electrical heat generating electrical load devices and with aircraft electronic load devices all disposed throughout the aircraft. The invention provides a plurality of electrical energy storage devices located at selected distributed locations disposed throughout the aircraft and connected locally to the array of electrical bus conductors at each selected distributed location, the electrical energy storage devices including a super capacitor element and an energy coupling electronic circuit communicating a bus voltage-supplementing transient flow of electrical energy from the super capacitor to the electrical bus conductors. The energy coupling electronic circuit comprises an electrical inductance element connected with the super capacitor and in series with the flow of electrical energy from the super capacitor to the electrical bus conductors, an electrical switching element connected with the electrical inductance element and generating electrical current undulations in the inductance element, and an output electrical voltage regulator controller of pulse width time parameters in the electrical inductance element electrical current undulations. The invention also provides a feedback controlled super capacitor charging circuit connected in energy supply relationship between the electrical bus conductors and the super capacitor element with the feedback controlled super capacitor charging circuit including first and second series connected controllable current limiting resistance elements connected in series with a super capacitor charging current path and with the first controllable current limiting resistance element. The first controllable current limiting resistance element comprises a MOSFET switching transistor-shunted passive electrical resistance element and a first Zener diode referenced super capacitor voltage responsive saturating operational amplifier binary driving circuitry connected to the MOSFET switching transistor. The second controllable current limiting resistance element comprises a charging current-conducting MOSFET analog transistor and second Zener diode referenced super capacitor voltage responsive operational amplifier analog driving circuitry connected to the MOSFET analog transistor. The switching MOSFET transistor shunted passive electrical resistance element comprises an electrical resistance element having electrical energy dissipation capability significantly greater than that of the charging current-conducting MOSFET analog transistor.

BRIEF DESCRIPTION OF THE DRAWINGS

FIG. 4e shows another operating waveform for the FIG. 3 circuit.

FIG. 4f shows another operating waveform for the FIG. 3 circuit.

FIG. 4g shows another operating waveform for the FIG. 3 circuit.

DETAILED DESCRIPTION

Power losses in super capacitor chargers can be much higher than those in conventional battery chargers. This is because the voltage of the charger for a conventional battery is normally only slightly greater than that of the battery and the voltage difference between the input and the output of the charger is therefore relatively small—since the conventional battery has a generally fixed terminal voltage—at least once an initial forming charge or a charge from the "stone dead" condition has occurred. On the other hand, the voltage of a super capacitor as used in the presently contemplated aircraft bus supplementing service may fall to zero frequently during a use cycle. Indeed the greatest volumetric and weight efficiency for a bus supplementing arrangement according to the present invention occurs when the super capacitor is called upon to operate between terminal voltages of zero and maximum rated capacitor voltage—since this change of voltage represents the largest quantity of stored energy a given super capacitor of a given weight and size and voltage capability can provide.

Because of this wide range of super capacitor operating voltage, a voltage which may be identified as $V_c$, the charger for a super capacitor must be capable of operating over a wide range of charger input to charger output voltage difference, and also operate with a charging current capability which will meet system time requirements for recharging duration of the super capacitor. In essence, these operating constraints require that something in the super capacitor charger, the charger's regulator circuit, be capable of dissipating the large voltage difference between a fully discharged super capacitor while passing the rated charging current (or an even greater initial charge current). This reasoning assumes a waveform chopping regulator is excluded for reasons involving electrical noise or other reasons. Therefore, the super capacitor charger regulator must be capable of operating under frequent conditions of high power dissipation, dissipation of maximum super capacitor voltage at a current equaling the maximum attainable charging current. While this maximum condition mitigates with increasing super capacitor voltage in each charging cycle, the power loss in as large as the charger voltage multiplied by the peak charging current during frequent intervals of time, i.e., when use of the super capacitor bus voltage supplementation is great (e.g., during intervals of frequent or long term and large magnitude transient loading of the aircraft bus). Hence, the power loss in a super capacitor charger can be high. The present invention provides a reliable and simple regulator arrangement which is capable of this high power loss operation for any imposed operating condition.

Figure 1:
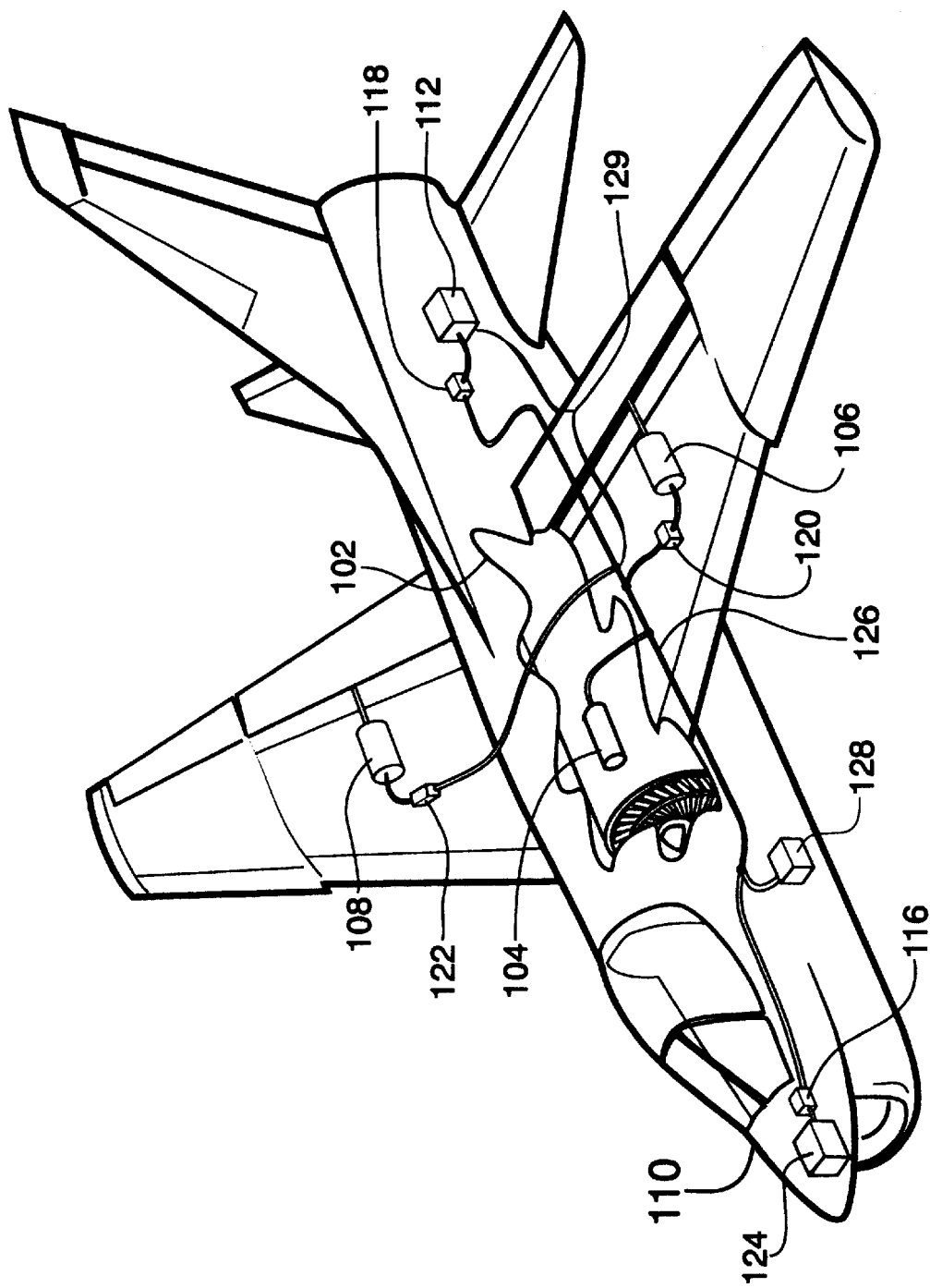
FIG. 1 shows a representative aircraft energy distribution bus with bus loads and bus supplementing apparatus which may incorporate the present invention.

FIG. 1 in the drawings shows an aircraft electrical energy distribution system in which a super capacitor charging apparatus according to the present invention may be used. In the FIG. 1 apparatus an aircraft 110 of the tactical or fighter type is shown to be provided with a direct current energy supply bus 126 capable of conveying electrical energy between a plurality of energy sourcing, storing and using devices distributed throughout the aircraft 110. The bus 126 may represent a plurality of electrically insulated conductors or a single electrically insulated conductor operating by way of a common ground path inclusive of the framework, skin metal and other parts of the aircraft 110. Some aircraft use buses generally of the type represented at 126 for distributing alternating current energy, often multiple phased alternating current energy of some few hundred volts electrical potential, while other aircraft, particularly currently active and older aircraft employ a lower voltage direct current bus often of some 28 volts direct current potential.

Connected to the energy supply bus 126 in FIG. 1 are a plurality of devices which cause the flow of electrical current in the bus conductors. These devices include an electrical generator or alternator and rectifier array which are represented at 104 in FIG. 1 and an electrical battery represented at 128 in FIG. 1; these devices act as sources of the electrical energy distributed by the energy supply bus 126. The battery 128 in FIG. 1 of course serves as a temporary repository for electrical energy which originates in the generator/alternator 104 or from ground based energy sources during some phases of aircraft operation. Electrical energy consuming devices represented in the FIG. 1 drawing include the aircraft wing flap positioning motors 106 and 108 and the electronic circuit devices 112 and 124 which are often mounted in remote locations of the aircraft 110—in such regions as the illustrated nose and tail recesses. Electrical resistance loads in the form of lamps and heating elements within the aircraft are also frequently encountered as bus loads. The FIG. 1 illustrated loads are intended to represent other motor and inductive element-inclusive loads and a variety of electronic loads which appear in modern day aircraft. The electronic circuit device 112 and electronic circuit device 124 loads, for examples, may be considered as typically representing a radar system and an avionics computer system.

The physical length of the energy supply bus 126 represented in FIG. 1, particularly the longer length portions of this bus as indicated at 129, inevitably introduces electrical resistance and electrical inductance components of electrical impedance into the aircraft's bus circuit. These components of course add to the impedance components already present in the generator/alternator 104 and the battery 128 to provide an effective bus impedance that is usually of some low but certainly not zero value. This effective impedance is of course greatest at remote locations of the bus such as in the locations occupied by the electronic circuit devices 112 and 124. This impedance although lower in central portions of the aircraft is nevertheless usually of sufficient magnitude even there to provide transient and steady state voltage drops on the bus in response to the heavy current demands of loads such as the motors 106 and 108 or in response to what is usually the greatest load imposed on an aircraft bus, i.e., current flow to the propulsion engine starting motor. (Most commercial aircraft even when energized by a large ground power unit incur noticeable cabin light dimming with engine starter energization.) Some electronic loads such as a high energy laser or high energy radio frequency transmitter can also impose severe and short or long duration transient loading on a bus of the type shown at 126.

It is of course the overall intent of the present and the other two above identified patent documents in the present series to minimize the effects of these non zero bus impedances, i.e., to limit the transient and to some degree the steady state voltage changes experienced at various points along the energy supply bus 126. Although these voltage changes are not usually significant with respect to operation of electromechanical devices such as the motors 106 and 108 or heating loads, such voltage changes can be quite a different matter to the typical electronic systems represented by the devices 112 and 124. In some such loads system energy supply transients can become coupled into low level signal apparatus, provide false signal data, alter latched or unlatched conditions and even result in component part failures. Practicality and such factors as weight and cost considerations however limit the degree to which such electronic systems can be separately energized from electromechanical loads in the environment of an aircraft. Through the addition of energy storing elements located close to heavy electromechanical loads and close to sensitive loads such as the electronic circuit devices 112 and 124 it is found that many of the harmful voltage transients encountered on an aircraft bus can be either eliminated or reduced in magnitude or slowed in onset (i.e., high frequency energy content attenuated) to the point of reducing their effect on sensitive loads. These elimination, reducing and slowing effects may, for example, significantly reduce the electromagnetic coupling of such transients to sensitive internal components of the electronic circuit device 112 and 124 or alternately bring the correction of such transients within the capability of power supply regulators usually incorporated in devices such as these. The concepts of the present invention also extend to a supplying of aircraft energy during brief periods of source interruption or need for emergency power sourcing since these conditions are essentially quantative extensions of the contemplated transient conditions; additional discussion of this capability appears in the above incorporated by reference Feedforward Control of Aircraft Bus DC Boost Converter", AFD 00129 Ser. No. 08/843,428, patent application.

In the present series of patent documents, this correction of transients on the energy supply bus 126 is based on the energy storage capability of the large capacitors which have become known as super capacitors. This correction is based not on the low electrical impedance such capacitors may offer at their terminals but on the energy storage ability such capacitors can provide when operated over relatively large swings of terminal voltage. (Use of the former capacitor low impedance characteristic results in volumetric and weight efficiencies which are deemed too low for aircraft use since much of the super capacitors voltage capability is wasted in storing energy that is never accessed in this application, i.e., in Coulombs of energy vested in capacitor voltage lower than that which can be tolerated on the energy supply bus 126. Moreover, the super capacitor element may not provide the lowest available impedance for such a capacitor.) In the present of these patent documents one aspect of or one arrangement for communicating electrical energy from the bus being improved upon to the super capacitor element for storage and later bus transient-reduction use is addressed. In the FIG. 1 drawing the super capacitor inclusive energy storing elements which are located close to heavy electromechanical loads and close to sensitive loads are indicated at 116, 118, 120 and 122.

By way of additional comparison of the super capacitor with other energy storage angements, battery charging has been indicated above to be commonly accomplished through a linear or Class A amplifier configured voltage regulator. In general, the power loss in such battery charger linear regulators is equal to the product of the voltage drop within the charger and the current flowing through the charger. In the case of most battery chargers, the input voltage of the battery charger to this regulator is only slightly higher than that across the battery. Thus, the voltage drop across the battery charger regulator is relatively low and the power loss in battery charger and its regulator is also low. Typically, such less efficient linear regulators are used instead of the more efficient switching regulators in performing battery charging in order to prevent electromagnetic interference (EMI) effects in the regulator—effects which can be particularly difficult to obscure with the sharp wave fronts observed in battery charging currents. Although switching regulators are more efficient, the shielding required within a regulator or a battery operated load device that is sensitive to EMI adds significant complexity and cost to the battery operated device and is therefore desirably avoided. These battery chargers also typically have means of regulating the maximum current delivered to the battery.

Since power losses in super capacitor chargers may be much higher than those in such battery chargers, and the switching regulator is again undesirable for EMI reasons, the present document describes an improved super capacitor charger linear regulator arrangement that is capable of accommodating large linear regulator dissipation operating conditions, accommodating such dissipations economically and over any required operating period. The invention involves an electrical circuit which includes an improved series voltage regulator in which the required power dissipation is accomplished in low cost passive components during selected non-critical operating cycle portions and in active controlled components during other more critical operating cycle portions. The achieved circuit is simple, reliable, inexpensive, and provides fast charging of super capacitors.

Initially according to the invention, the charging of a super capacitor takes place through a power resistor and the turned-on or saturated resistance of a pass transistor in the regulator. Then the super capacitor is charged through two saturated transistor resistances. Finally near the end of charging, the described regulator accomplishes charging through a saturated transistor resistance and a linear-operated transistor in an arrangement wherein the charger acts like a voltage regulator, thus protecting the capacitor against overcharging and voltage breakdown damage. Since most of the energy supplied to the super capacitor is actually transferred through the power resistor, the charging process can be made fast and can result in most power dissipation occurring in the power resistor, whereas power loss in the regulator pass transistor is low. Although any type of transistor may be used for the saturated and linear-operated transistors, MOSFET devices providing ON-resistances of the linear type are disclosed in the following description.

Figure 2A:
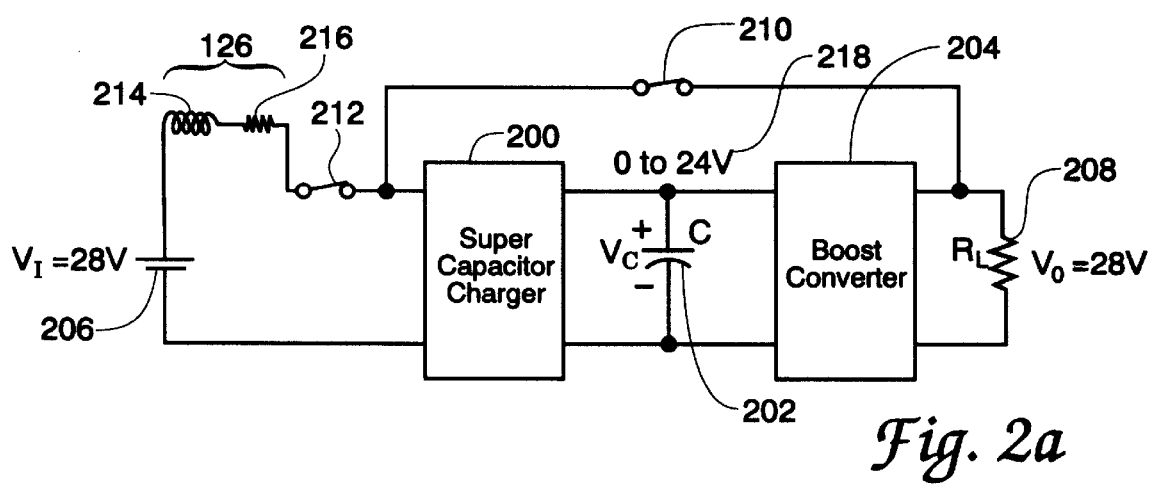
FIG. 2a shows a block diagram of a super capacitor-inclusive aircraft bus supplement apparatus under one bus operating condition.
Figure 2B:
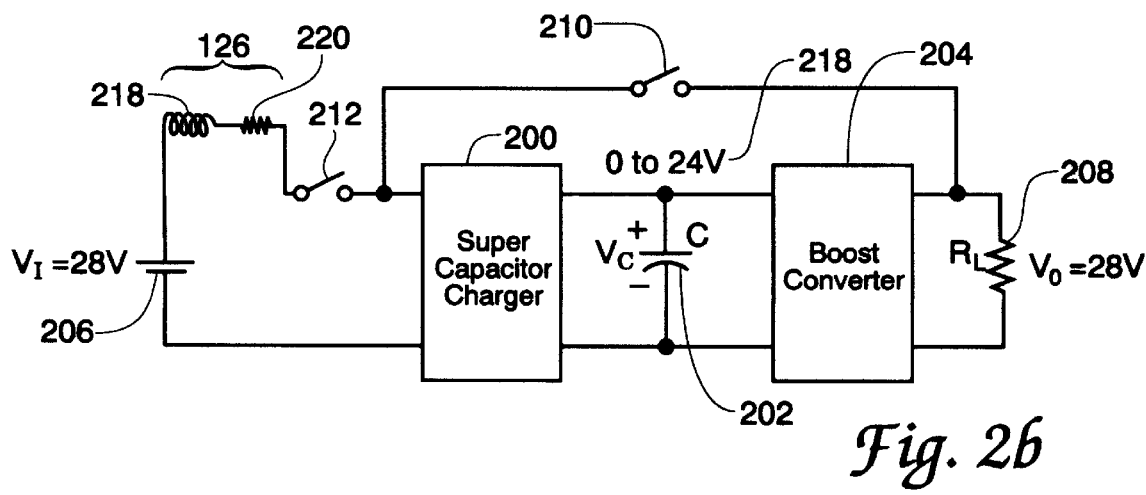
FIG. 2b shows a block diagram of a super capacitor-inclusive aircraft bus supplement apparatus under a second bus operating condition.

A block diagram of a bus supplemented aircraft power system which is based on use of a super capacitor energy storage element is shown in FIG. 2a and FIG. 2b of the drawings. The FIG. 2a and FIG. 2b apparatus represents one of the super capacitor inclusive energy storing element shown at 116, 118, 120, and 122 in the FIG. 1 drawing. This energy storing element consists of a super capacitor charger 200, a super capacitor element 202, and a boost dc—dc power converter 204 together with the source disconnecting switch 212 and the converter bypass switch 210. The super capacitor charger 200 charges the super capacitor 202 before or after recovery of the dc input source 206 (i.e., the aircraft bus 126) from a transient load condition. The boost converter 204 regulates the load voltage, i.e., the output of the super capacitor inclusive energy storing element at a selected voltage level during discharging of the super capacitor 202.

When aircraft energy supply bus transient conditions are considered it is helpful to recognize that the conductors of such a bus, like any electrical conductor, add finite quantities of electrical inductance and electrical resistance to the effective "electrical network" supplying any given bus load or load group. The inductive component 214 and the resistive component 216 are added to the FIG. 2 circuit diagrams to represent these real life conditions. The magnitude or electrical size of these bus components and the voltage transients they enable is dependent upon a number of factors including of course bus length (i.e., aircraft physical dimensions), bus conductor size, bus current/voltage rating and bus physical configuration. The tactical aircraft represented in the FIG. 1 drawing is generally given to lower magnitudes of each of these components 214 and 216 than is the case with the aircraft shown in the other two of the present patent documents identified above or a large aircraft such as the popular Boeing 747 and the military C 130 aircraft. The large multi-engine multiple generator/alternator aircraft indeed include a composite multiple rotating machine energy source of low effective impedance but inevitably incur larger values of inductance and resistance in the longer bus conductors needed to reach widely separated engine and fuselage locations—and are therefore equally susceptible to the bus transient aspects addressed by the present inventions. For language convenience purposes, in the present patent documents the generator/alternator locations of even these large multi engine aircraft are considered to be "centrally located" with respect to the bus loads which may be located at any other point in the aircraft. A representative range of values for the FIG. 2 illustrated bus equivalent circuit elements is 3–12 microhenrys of inductance for the inductive component 214 and 1–40 miliohms of resistance for the resistance element 216—in a bus configured for use with the above-described high voltage energization arrangement; lower values of inductance and resistance usually prevail for aircraft with in FIG. 1 and other lower bus voltages however higher currents also prevail there (for similar load wattages) and the resulting bus transients therefore tend to be of a similar percentage of bus voltage in magnitude.

Continuing with the FIG. 2 drawings, when the dc input voltage source 206 functions in steady state without the presence of load transients, it supplies a dc load, which may be the electronic circuit device 112 of FIG. 1, with the indicated voltage of 28 volts. For convenience the load 112 of FIG. 1 is represented by a load resistance 208 in FIG. 2. During such steady state conditions according to the concepts of the present inventions, energy may be transferred from the dc source 206 to the super capacitor 202 in an interval of capacitor charging. This energy flow also maintains the super capacitor 202 fully charged in its standby mode. When the dc input voltage from the source 206 and the bus 126 incurs a voltage transient or even fails briefly, energy is transferred from the super capacitor 202 to the dc load through the boost dc—dc power converter 204. The voltage across the super capacitor 202 decreases as the capacitor is discharging during this interval. A range of voltage over which the super capacitor 204 may operate is indicated at 218 in both FIG. 1a FIG. 1b, such low voltages being in keeping with the present state of the super capacitor art. The boost converter 204 is therefore used to regulate the load voltage against diminishment and variation of the super capacitor 202 voltage and also against load current-induced voltage changes.

In FIG. 2b there is represented the conditions existing during the interval when the dc input voltage from the source 206 or the bus 126 incurs a load transient or even fails briefly. During this interval the switch 212 is effectively open as is the switch 210 and energy flow to the load originates from the super capacitor 202. The effective opening of the switches 210 and 212 in FIG. 2 during transient load conditions may be considered as one possible effect of the inductive element 214 being present in the FIG. 2 circuit; i.e., during a load transient the source 206 is effectively disconnected from its normal function of supplying the load 208 by one of the low pass filter behavior of the inductance 218 or by the tendency of the energy storing characteristic of the inductance 218 to maintain only an existing level of current flow in itself and the load. Under the FIG. 2b conditions therefore the FIG. 2 circuit is operating in the transient supplementing condition contemplated in the present series of inventions.

Figure 3:
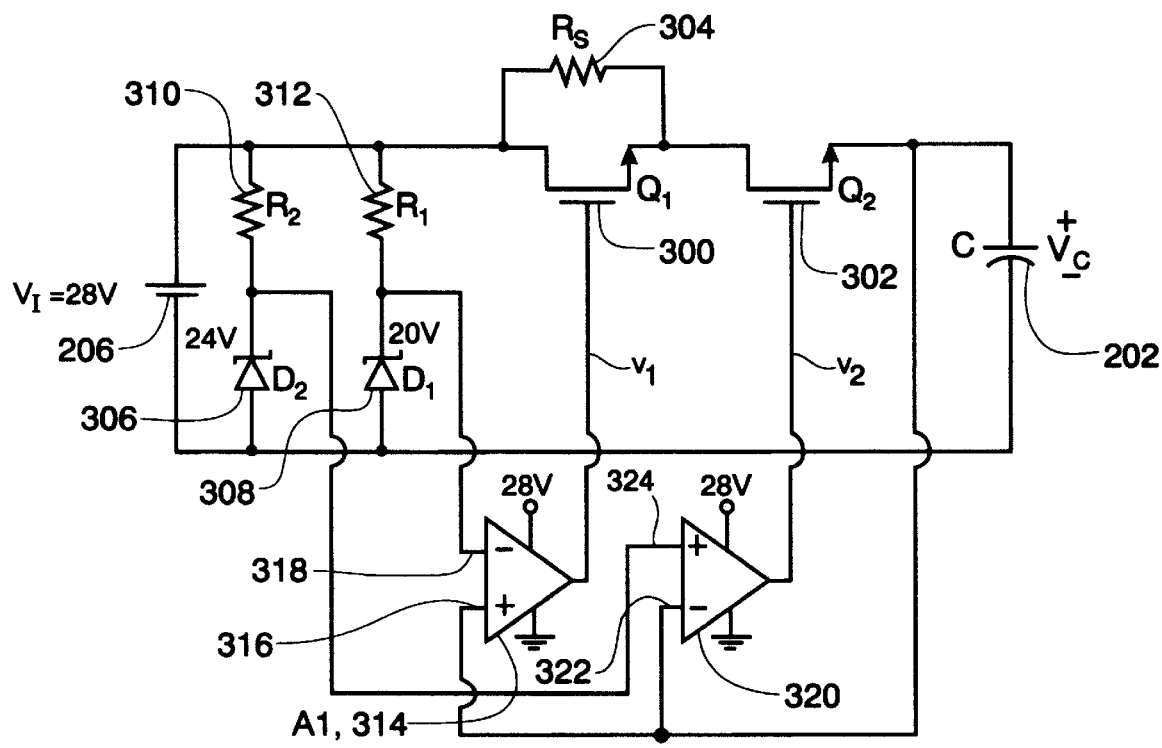
FIG. 3 shows a super capacitor element charging arrangement according to the present invention.
Figure 6:
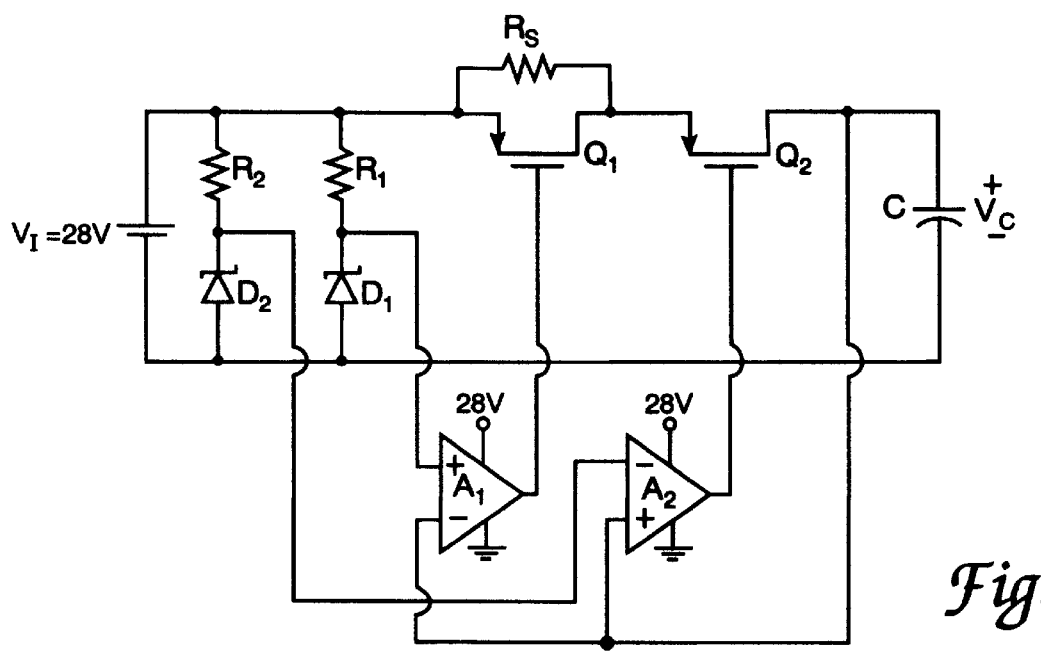
FIG. 6 shows another alternate arrangement of the present invention.

FIG. 3 in the drawings shows a preferred arrangement for the super capacitor charger 200 of FIG. 2. The FIG. 3 circuit consists of two N-channel power MOSFETs 300 and 302, a series power resistor 304, two reference voltage sources 306 and 308 with their energizing or current sourcing resistances 310 and 312, and two operational amplifiers 314 and 320. In the FIG. 3 circuit one reference source is composed of a Zener diode D1, 308, and resistor R1, 312. Its output voltage $V_{Z1}$ is lower than the selected voltage of a fully charged super capacitor. The other reference source consists of a Zener diode D2, 306, and a resistor R2, 310. Its output voltage $V_{Z2}$ is equal to the specified voltage of the fully charged super capacitor. The operational amplifier A1, 314 is used as a voltage comparator in the FIG. 1 circuit, the operational amplifier A2, 320 as a linear driver of the transistor Q2, 302. Both operational amplifiers can be contained a single package. A resistive voltage divider can be used in the negative feedback loop of the operational amplifier A2 if needed to obtain something other than a one-to-one ratio between the voltage of the voltage source 306 and the output voltage. Other n-type active power devices, such as bipolar transistors, Insulated Gate Bipolar Transistors, MOS Controlled Transistors, and thyristors, can be used instead of power MOSFETs. P type devices can also be used with other circuit arrangements as is indicated in FIG. 6 of the drawings herein.

Figure 7A:
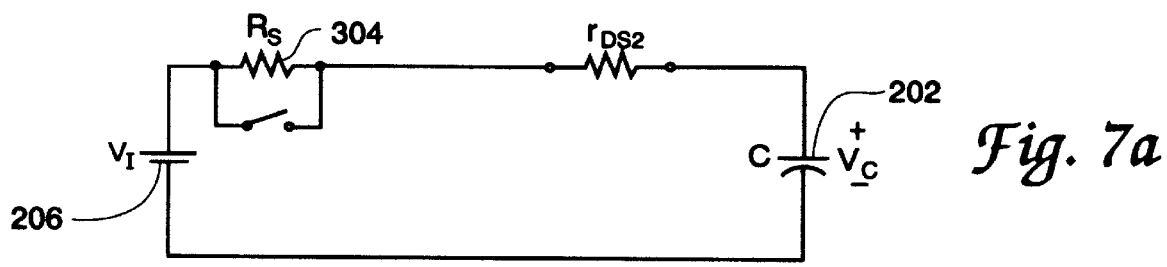
FIG. 7a shows an equivalent circuits of the present invention for a first of three operating time intervals.
Figure 7B:
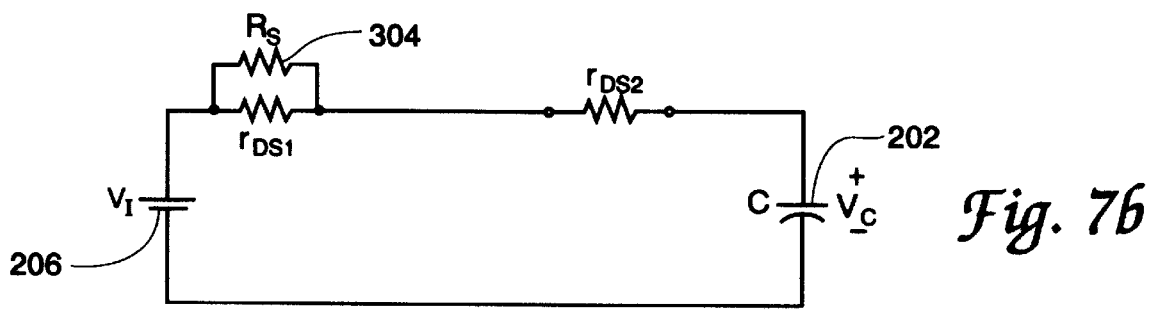
FIG. 7b shows an equivalent circuit of the present invention for a second of three operating time intervals.
Figure 7C:
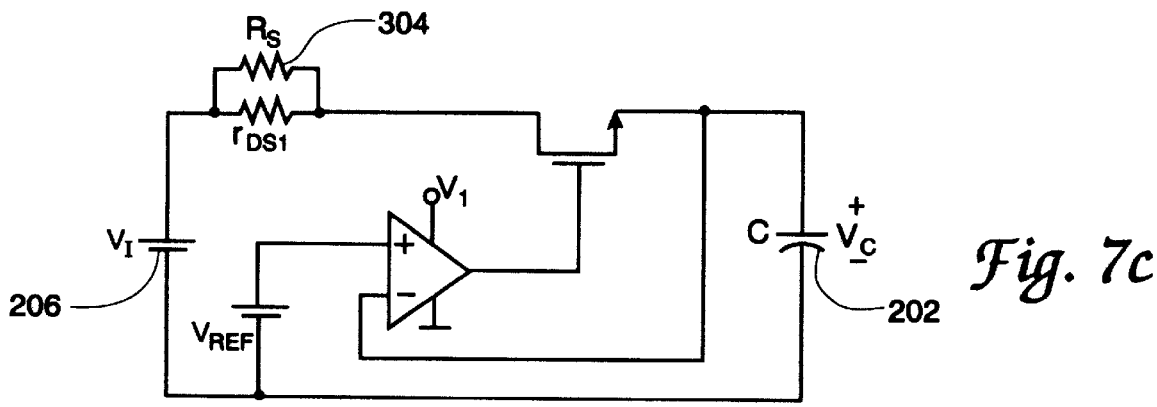
FIG. 7c shows an equivalent circuit of the present invention for a third of three operating time intervals.

With use of the FIG. 3 apparatus the charging sequence for the super capacitor 202 therefore includes three charging modes of operation:

A charging mode through the series resistance $R_s$, 304,

A charging mode through the ON-resistances of the MOSFETs 300 and 302, and A voltage regulation linear transistor operation mode involving only the MOSFET 302. FIG. 7 in the drawings shows in FIG. 7a, FIG. 7b and FIG. 7c equivalent circuits for the FIG. 3 super capacitor charger for each of these three operating modes. The voltage waveforms resulting from charging in each of these modes are shown in FIG. 4 of the drawings in the views of FIG. 4a, FIG. 4b, FIG. 4c, FIG. 4d, FIG. 4e, FIG. 4f and FIG. 4g.

In order to discuss the FIG. 3, FIG. 4 and FIG. 7 disclosed information in detail let it be assumed that the super capacitor 202 is initially discharged to a zero volt condition. Referring first to FIG. 3, when the input voltage $V_I$, 206, of say 28 volts, is turned ON, a reference voltage $V_{Z2}$ (e.g., 24 volts) is applied to the non-inverting input of the operational amplifier A2, 320. The voltage at the remaining or inverting input of the operational amplifier A2, 320 is equal to the super capacitor voltage $V_C$, or initially to zero volts. Since the voltage at the amplifier's non-inverting input is higher than that at the inverting input, the output voltage $v_2$ of the operational amplifier A2 is high, near to say 27 volts under the power supply conditions recited in FIG. 3. Therefore, the gate-to-source voltage $V_{GS2}$ for the transistor Q2 is the difference between the output voltage of the operational amplifier 320 and the super capacitor voltage. Just after the input source is turned on, this voltage is 27 volts and gradually decreases as the super capacitor voltage increases during charging; this is illustrated in FIG. 4e. With the gate-to-source voltage $V_{GS2}$ high, the power MOSFET Q2, 302 is fully ON and presents its ON-resistance characteristic, e.g., 0.18 ohm, as a series resistance for super capacitor charging. An equivalent circuit representation of these conditions appears in FIG. 7b of the drawings. Under these conditions, the drain-to-source voltage of the transistor Q2 is very low, e.g., 0.1 volt, as appears in the initial portion of the FIG. 4g drawing. This results in a very low power loss in transistor Q2 during the early portions of the super capacitor charging process. For example, if the capacitor charging current is 1 Ampere, the power loss in the transistor Q2 is 0.1 Watt. Both the voltages $v_1$ and $v_2$ are measured between the output of the respective operational amplifier and ground.

Turning next to operation of the transistor Q1, after the input voltage $V_I$ is turned on, the reference voltage $V_{Z1}$ (e.g., 20 volts) is applied to the inverting input 318 of the operational amplifier 314. The voltage at the non-inverting or +input 316 of this amplifier is equal to the super capacitor voltage $V_C$. This voltage again gradually increases as the super capacitor is charged. As long as the super capacitor voltage $V_C$ is less than $V_{Z1}$, however, the output voltage $v_1$ of operational amplifier 314 remains low. It is in fact approximately equal to 2 volts, as appears in the early part of FIG. 4b, if the negative power supply pin of the operational amplifier 314 is connected to a potential of zero volts or ground. Neglecting the drain-to-source voltage of transistor Q2, the gate-to-source voltage $V_{GS1}$ of the transistor Q1 is therefore the difference between the output voltage $v_1$ of operational amplifier A1 314 and the super capacitor voltage, a negative voltage; i.e., the gate is more negative than the source in the transistor Q2 as the super capacitor initially charges. This event is represented in the early part of FIG. 4d in the drawings.

Figures 4A, 4B, 4C, 4D:
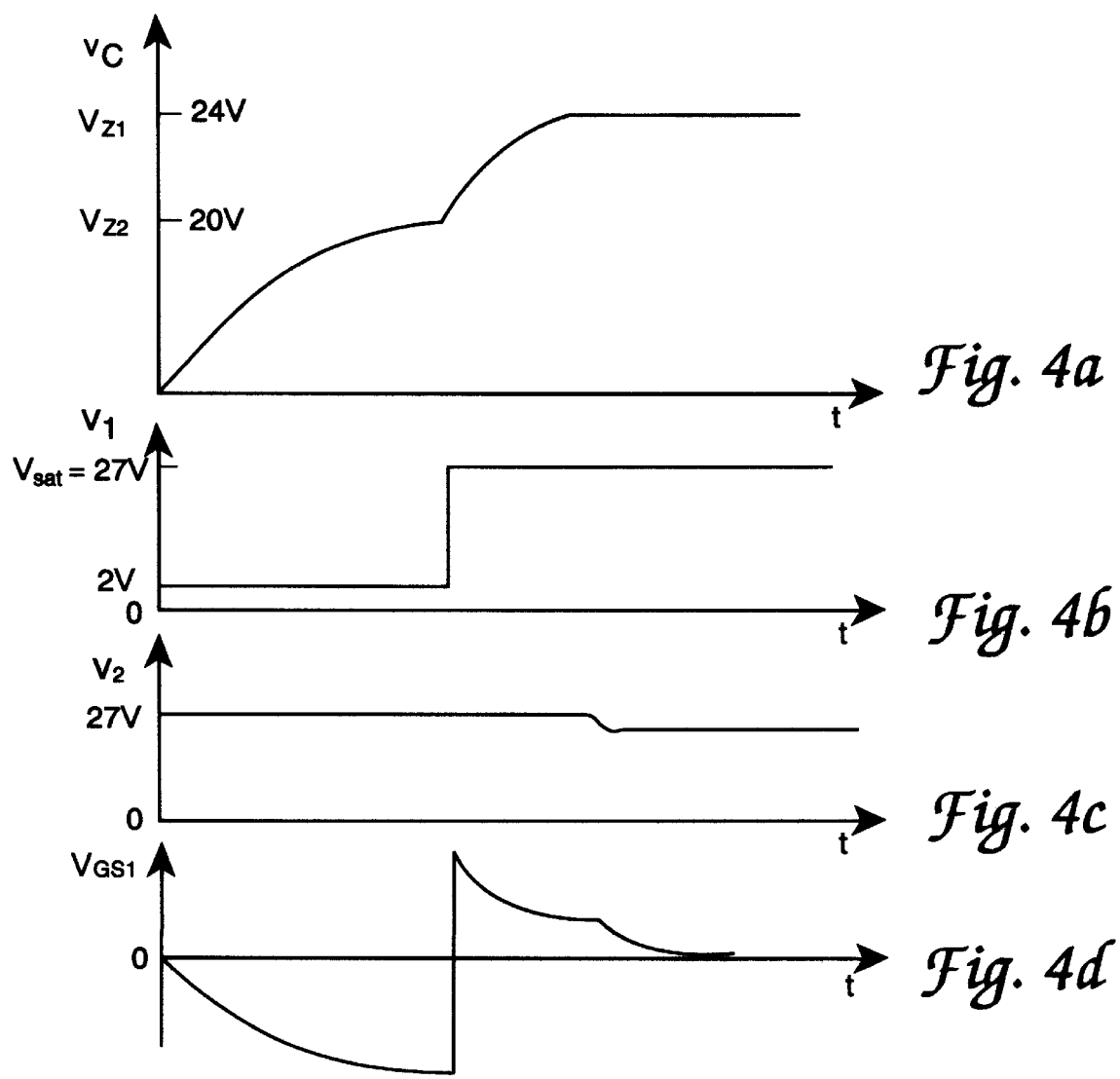
FIG. 4a shows a first operating waveform for the FIG. 3 circuit.
FIG. 4b shows another operating waveform for the FIG. 3 circuit.
FIG. 4c shows another operating waveform for the FIG. 3 circuit.
FIG. 4d shows another operating waveform for the FIG. 3 circuit.

This $V_{GS1}$ gate to source voltage in fact decreases from approximately zero volts to a high negative voltage (2 volts–$V_{Z1}$) over time as FIG. 4d shows. Therefore, the power MOSFET Q1, 300 is OFF during this interval and most significantly, the super capacitor 202 is charged through the series power resistor $R_s$. This charging is represented by the initial curve portion in FIG. 4a and is represented by the open switch condition shown in the FIG. 7a drawing. Charging current to the super capacitor in fact decreases exponentially from $V_I/R_s$ under these conditions and the voltage across the series resistor decreases exponentially from $V_I$ as charging increases. In fact, almost the entire power loss in the charger is dissipated in the series resistor $R_s$ during this period. When the voltage across the capacitor becomes close to its final value, the charging current is low, reducing the charging speed. This effect can be observed in the terminal part of the initial curve segment in FIG. 4a.

In order to speed up the super capacitor charging, the series resistance $R_s$, 304, is bypassed by the MOSFET Q1, 300 an event which occurs as follows. When the super capacitor voltage $V_C$ becomes higher than the 20 volt reference voltage $V_{z1}$, the output voltage $v_1$ of the operational amplifier A1 goes high, from 2 volts to approximately 27 volts. Therefore, the gate-to-source voltage of transistor Q1 becomes equal to VGSI or 27−20=7 volts. Thus, the transistor Q1 turns ON (as shown in FIG. 4b) and the super capacitor again charges at a fast higher current rate. This turn-ON of the Q1 transistor is represented in the terminal portion of the FIG. 4a curve where the initial high rate of super capacitor voltage change is apparent. It should be noted that the FIG. 3 circuit arrangement causes this change of charging rates to occur in response to attained super capacitor voltage and that this turn-ON is the cause of the first transition in several of the FIG. 4 curves. The bus 126 current flow resulting from the FIG. 4a represented initial and second high charging rates can of course be controlled by the use of appropriate series resistances or by limiting the gate signal to one of the transistors Q1 and Q2 if excessive for a particular aircraft bus and load configuration. It is of course possible to add additional stages of the nature of the A1 and $Q_1$ stage in FIG. 6 in order to change the time constants shown in FIG. 4a one or more additional times in lieu of the two changes represented in this FIG.

Following this turn-ON of the transistor Q1, when the super capacitor voltage reaches the reference voltage $V_{Z2}$, the gate-to-source voltage $V_{GS2}$ is very close to the threshold voltage of the MOSFET transistor Q2, 302 and this transistor is no longer driven sufficiently hard to remain in low drain-to-source voltage saturation; this event is represented in the curve transition appearing in FIG. 4c of the drawings and in the second transition appearing in FIGS. 4d and 4g. As a result of this change, only a low current is allowed to flow through transistor Q2 into the super capacitor once it has reached a state of substantial charge, a current to compensate for the self-discharging of the super capacitor due to its leakage current, for example. Transistor Q2 in the FIG. 3 circuit may therefore be considered to act as a series pass voltage regulator transistor. The equivalent circuit of FIG. 7c is descriptive of the FIG. 3 circuit during this charging mode.

A secondary advantage of the present invention charging arrangement arises from the fact that absent some corrective arrangement in the circuitry of a linear voltage regulator, such a regulator will function differently in response to being coupled to a resistive and to a capacitive load. For resistive loads, the error signal received by, for example, an operational amplifier used in the linear regulator is small since the regulator consistently maintains regulated output voltage in close relationship with the regulator reference voltage and therefore the regulator output voltage is essentially determined by the reference voltage at any instant of time. For capacitive loads, however, the error signal can be quite large especially during initial charging of the capacitive load. This is because the fundamental error signal in such regulation arrangements is the difference between the reference voltage and the thus far-charged capacitor voltage. Such a large error signal is, however, capable of overdriving an operational amplifier and forcing the amplifier into its saturation region where loss of regulator control for a time interval during a capacitor charging event may occur. Although other circuit arrangements which avoid this difficulty are believed possible, the above described two step, two operational amplifier arrangement of the present invention is believed to be especially less vulnerable to this difficulty since its saturation-susceptible linear error amplifier is protected from large input signals by operation of its companion switching regulator circuit.

Figure 5:
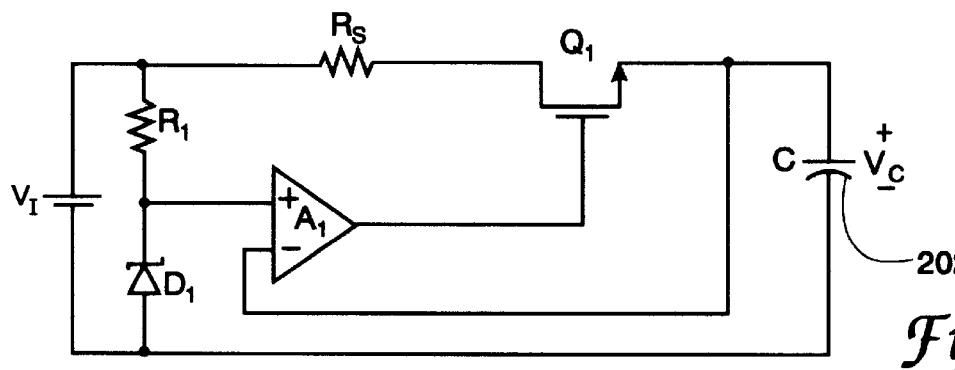
FIG. 5 shows an alternate and simplified arrangement of the FIG. 3 super capacitor element charging arrangement.

Several variations of the present super capacitor charger invention are possible. FIG. 5, for example, shows a simplified version of the charger of FIG. 2 and FIG. 3, in which the transistor in parallel with the series resistor Rs, the comparator A1, and the Zener reference voltage source composed of D2, 306, and R2, 310 are each deleted. This charger is slower than that of FIG. 1 because the super capacitor is charged through the series resistor Rs at all values of super capacitor voltage.

FIG. 6 shows a super capacitor charger, in which p-channel power MOSFETs are used, instead of n-channel power MOSFETs. The inverting and non-inverting inputs to the operational amplifier circuits are interchanged in this FIG. 6 arrangement to achieve proper circuit polarity relationships. As may be apparent from the FIG. 3 and FIG. 6 circuit diagrams other such variations of the super capacitor charger may also be achieved by replacing the power MOSFET devices with either PNP or NPN junction power transistors. With such junction transistor devices, the transistor controlling signals from the operational amplifiers are preferably converted from the described voltage signals to current signals by the use of appropriately sized series connected electrical resistance elements, for example.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Direct current aircraft electrical energy distribution apparatus comprising the combination of:

a source of direct current electrical energy located in a central portion of said aircraft;

an electrical bus having an array of electrical bus conductors, including an electrically insulated conductor, connected with said source of direct current electrical energy, extending throughout said aircraft including less central portions of said aircraft, and connected in energizing relationship with a plurality of aircraft electrical load devices disposed throughout said aircraft;

a plurality of electrical energy storage devices located at selected distributed locations disposed throughout said aircraft and connected locally to said array of electrical bus conductors at each said selected distributed location, said electrical energy storage devices including a super capacitor element and an energy coupling electronic circuit communicating a transient flow of electrical energy from said super capacitor to said electrical bus conductors;

said energy coupling electronic circuit including electrical switch element inclusive electrical voltage changing circuits disposed in an energy flow path intermediate said super capacitor element and said electrical bus conductors, said electrical switch element being electronic voltage regulator controlled;

a feedback controlled charging circuit connected in capacitor recharge energy supply relationship between said electrical bus conductors and said super capacitor element, said charging circuit including first and second selectable series connected and output voltage controlled charge current-limiting energy dissipating elements.

2. The direct current aircraft electrical energy distribution apparatus of claim 1 wherein said feedback controlled charging circuit includes first and second series connected controllable current limiting resistance elements connected in series with a super capacitor charging current path.

3. The direct current aircraft electrical energy distribution apparatus of claim 2 wherein said first controllable current limiting resistance element is comprised of a switching transistor shunted electrical resistance element and super capacitor voltage responsive binary driving circuitry connected to said switching transistor.

4. The direct current aircraft electrical energy distribution apparatus of claim 3 wherein said second controllable current limiting resistance element includes a charging current-conducting analog transistor and super capacitor voltage responsive analog driving circuitry connected to said analog transistor.

5. The direct current aircraft electrical energy distribution apparatus of claim 4 wherein said first current limiting resistance element is a passive electrical resistance element having electrical energy dissipation capability significantly greater than that of said charging current-conducting analog transistor.

6. The direct current aircraft electrical energy distribution apparatus of claim 5 wherein said super capacitor voltage responsive binary driving circuitry, said super capacitor voltage responsive analog driving circuitry, and said first current limiting resistance element include electrical sizes selected to achieve greatest super capacitor complete-charging energy dissipation in said first current limiting passive electrical resistance element.

7. The direct current aircraft electrical energy distribution apparatus of claim 6 wherein said super capacitor voltage responsive binary driving circuitry, said super capacitor voltage responsive analog driving circuitry, and said first current limiting resistance element include electrical sizes achieving in excess of one-half of said super capacitor complete-charging energy flow through said first current limiting passive electrical resistance element.

8. The direct current aircraft electrical energy distribution apparatus of claim 6 wherein said aircraft electrical bus has an operating potential of 28 volts direct current, said super capacitor voltage responsive binary driving circuitry has an operating voltage threshold of 20 volts direct current and said super capacitor voltage responsive analog driving circuitry has a soft operating threshold centered about a super capacitor direct current voltage of 20 volts.

9. The direct current aircraft electrical energy distribution apparatus of claim 4 further including means for enabling dissipation in said first controllable current limiting resistance element in response to a low super capacitor terminal voltage and means for shunting disablement of dissipation in said first controllable current limiting resistance element in response to a selected greater super capacitor terminal voltage.

10. Direct current aircraft electrical energy distribution apparatus comprising the combination of:

a rotating dynamoelectric machine source of direct current electrical energy located in a central portion of said aircraft;

an electrical bus having an array of electrical bus conductors, including an electrically insulated conductor, connected with said dynamoelectric machine source of direct current electrical energy, extending throughout said aircraft including less central portions of said aircraft, and connected in energizing relationship with a plurality of electrical switch-controlled rotating machine, and electrical heat generating electrical load devices and with aircraft electronic load devices all disposed throughout said aircraft;

a plurality of electrical energy storage devices located at selected distributed locations disposed throughout said aircraft and connected locally to said array of electrical bus conductors at each said selected distributed location, said electrical energy storage devices including a super capacitor element and an energy coupling electronic circuit communicating a bus voltage-supplementing transient flow of electrical energy from said super capacitor to said electrical bus conductors;

said energy coupling electronic circuit comprising an electrical inductance element connected with said super capacitor and in series with said flow of electrical energy from said super capacitor to said electrical bus conductors, an electrical switching element connected with said electrical inductance element and generating electrical current undulations in said inductance element, and an output electrical voltage regulator controller of pulse width time parameters in said electrical inductance element electrical current undulations;

a feedback controlled super capacitor charging circuit connected in energy supply relationship between said electrical bus conductors and said super capacitor element;

said feedback controlled super capacitor charging circuit including first and second series connected controllable current limiting resistance elements connected in series with a super capacitor charging current path;

said first controllable current limiting resistance element comprising a MOSFET switching transistor shunted passive electrical resistance element and first zener diode referenced super capacitor voltage responsive saturating operational amplifier binary driving circuitry connected to said MOSFET switching transistor;

said second controllable current limiting resistance element comprising a charging current-conducting MOSFET analog transistor and second zener diode referenced super capacitor voltage responsive operational amplifier analog driving circuitry connected to said MOSFET analog transistor;

said switching MOSFET transistor shunted passive electrical resistance element comprising an electrical resistance element having electrical energy dissipation capability significantly greater than that of said charging current-conducting MOSFET analog transistor.

11. The method of supplying direct current electrical energy of reduced interruption and transient voltage content to electrical loads located along an energy source-fed aircraft energy supply bus, said method comprising the steps of:

supplementing electrical energy supplied from said source via said aircraft energy supply bus to said electrical loads with electrical energy previously removed from said bus at a controlled removal rate and held in storage more proximate said electrical loads than said bus energy source;

storing said previously removed electrical energy in an electrical super capacitor storage element disposed in said more proximate location;

operating said electrical capacitance storage element over a change of voltage range characteristic of removing and replacing at least one half of energy stored in said electrical capacitance storage element, a range exceeding electrical voltage transient amplitudes acceptable on said aircraft energy supply bus;

coupling energy from said electrical capacitance storage element to said energy supply bus of lesser voltage transient range via an electronic switching circuit-modulated electrical inductive element of variable coupling ratio, an element also located more proximate said electrical transient-generating load;

supplying capacitor charging energy from said bus to said electrical capacitance storage element at a first time constant-characterized rate during a low capacitor voltage initial portion of a capacitor charging cycle;

adding capacitor charging energy to said electrical capacitance storage element from said bus at a second time constant-characterized rate during a higher capacitor voltage later portion of said capacitor charging cycle;

regulating a final steady state highest capacitor voltage at said second time constantcharacterized charging rate during intervals between capacitor charging and bus supplementing events.

12. The method of supplying direct current electrical energy of claim 11 further including the step of controlling said first time constant-characterized rate using series-connected first and second electrical resistance elements.

13. The method of supplying direct current electrical energy of claim 12 further including the step of shunting said first electrical resistance element to achieve said second time constant-characterized capacitor charging rate.

14. The method of supplying direct current electrical energy of claim 13 wherein said step of shunting said first electrical resistance element to achieve said second time constantcharacterized capacitor charging rate includes the step of driving a transistor shunting said first electrical resistance element into a conducting state.

15. The method of supplying direct current electrical energy of claim 14 further including the step of controlling said first time constant-characterized rate and said second electrical resistance element magnitude via changing conductivity of a transistor element.

16. The method of supplying direct current electrical energy of claim 15 further including the step of changing said conductivity of a transistor element by changing a carrier flow quantity in a field-effect transistor channel region.

17. The method of supplying direct current electrical energy of claim 15 further including the step of changing said conductivity of a transistor element by changing a carrier flow quantity in a bipolar transistor base region.

18. The method of energizing a combination of electrical transient-generating and transient-intolerant direct current electrical loads located at electrical inductance and electrical resistance source-decoupled points along an aircraft energy supply bus with electrical energy of attenuated electrical transient voltage variation, said method comprising the steps of:

supplementing electrical energy supplied via said aircraft energy supply bus to said electrical inductance and electrical resistance source-decoupled electrical transient-generating load with additional electrical energy previously removed from said bus at a selected slow and controlled low current removal rate and held in storage adjacent one of said electrical transientgenerating load and said transient-intolerant electrical loads;

storing said previously removed electrical energy in an electrical super capacitance storage element located adjacent one of said electrical transient-generating load and said transient-intolerant electrical load;

operating said electrical capacitance storage element over a super capacitance change of voltage range capable of exchanging at least one-half of an energy quantity storable in said electrical super capacitance storage element, a range exceeding electrical voltage transient amplitudes acceptable at said transient-intolerant electrical load;

coupling energy from said electrical super capacitance storage element to said energy supply bus with an electronic switching circuit-modulated electrical inductive element of controllable coupling characteristics, an element also located adjacent one of said electrical transient-generating load and said transient-intolerant electrical load;

controlling said electrical capacitance storage element to aircraft energy supply bus controllable coupling characteristics according to an aircraft energy supply bus transientattenuating open loop control algorithm, an algorithm determinative of pulse width time parameters of said electrical inductive element modulation;

said open loop control algorithm generating longer inductive element energy-increasing closure times of a shunt connected transistor switch in response to transients of larger energy demand from said aircraft energy supply bus;

disconnecting said inductive element from said aircraft energy supply bus during said inductive element energy-increasing closure times of said shunt connected transistor switch in an operating cycle of said electronic switching circuit modulation.

19. The method of energizing a combination of electrical transient-generating and transient-intolerant direct current electrical loads of claim 18 wherein said step of storing said previously removed electrical energy in an electrical super capacitance storage element includes the step of supplying at least one-half of an electrical energy quantity storable in said super capacitor element through a passive electrical resistance element connecting said super capacitor element with said aircraft electrical energy supply bus.

20. The method of energizing a combination of electrical transient-generating and transient-intolerant direct current electrical loads of claim 18 wherein said step of storing said previously removed electrical energy in an electrical super capacitance storage element includes the step of supplying an initial super capacitor charge portion from said aircraft energy supply bus at a first time constant rate, a second super capacitor charge portion from said aircraft energy supply bus at a second time constant rate, and a third super capacitor charge portion from said aircraft energy supply bus at a third super capacitor leakage current-compensating time constant rate.

* * * * *